No. 637,841. Patented Nov. 28, 1899.
B. WILLARD.
VAULT COVER.
(Application filed Aug. 8, 1899.)
(No Model.) 2 Sheets—Sheet 1.

Witnesses.
Edw. Williams, Jr.
Alec F. Macdonald

Inventor.
Ben Willard,
by Albert G. Davis,
Atty.

No. 637,841. Patented Nov. 28, 1899.
B. WILLARD.
VAULT COVER.
(Application filed Aug. 8, 1899.)
(No Model.) 2 Sheets—Sheet 2.

Witnesses.
Edw. Williams, Jr.
Hect F. Macdonald.

Inventor.
Ben Willard,
by Albert G. Davis
Atty.

UNITED STATES PATENT OFFICE.

BEN WILLARD, OF NEW ORLEANS, LOUISIANA, ASSIGNOR TO THE GENERAL ELECTRIC COMPANY, OF NEW YORK.

VAULT-COVER.

SPECIFICATION forming part of Letters Patent No. 637,841, dated November 28, 1899.

Application filed August 8, 1899. Serial No. 726,583. (No model.)

*To all whom it may concern:*

Be it known that I, BEN WILLARD, a citizen of the United States, residing at New Orleans, in the parish of Orleans, State of Louisiana, have invented certain new and useful Improvements in Vault-Covers, (Case No. 1,078,) of which the following is a specification.

This invention relates to covers for manholes or vaults, and especially for manholes for cable-conduits; and its object is the provision of means by which the vaults or conduits can be well ventilated, but little dirt or refuse from above can penetrate the cover, and, what is of greatest importance in electric-conductor conduits, means by which water is prevented from flowing into the conduit.

I construct a cover with a hand-hole to which a perforated cover is fitted, or the hand-hole and cover may be dispensed with and perforations made through the cover itself. Below this hole a trap for water is supported upon or may be a part of the main cover, and this trap is provided with openings to establish communication between the conduit and the outer air through the hand-hole cover. A float is placed in the trap, and means is provided to permit water to flow through the hand-hole cover to the trap beneath the float. The float closes the hand-hole cover passages just before the water has reached a height sufficient to overflow into the conduit through the openings in the trap. Any suitable means is provided for removing the water from the trap. As here shown, the trap is removable for this purpose.

This invention may be embodied in various structures to perform the same functions, and all the uses to which any of such structures may be adapted to perform substantially the same functions are included within the scope of my invention.

Figure 1:
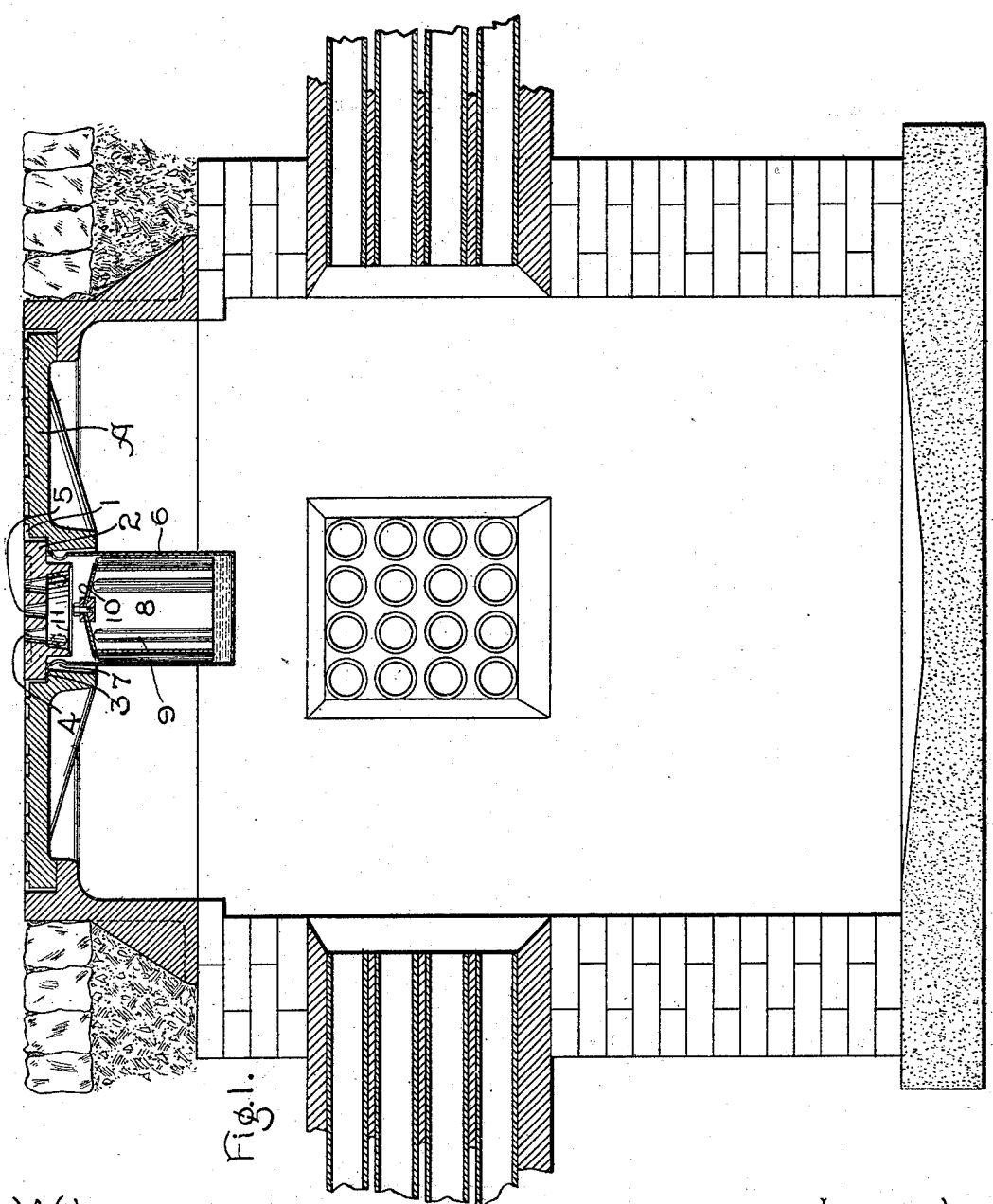
Figure 2:
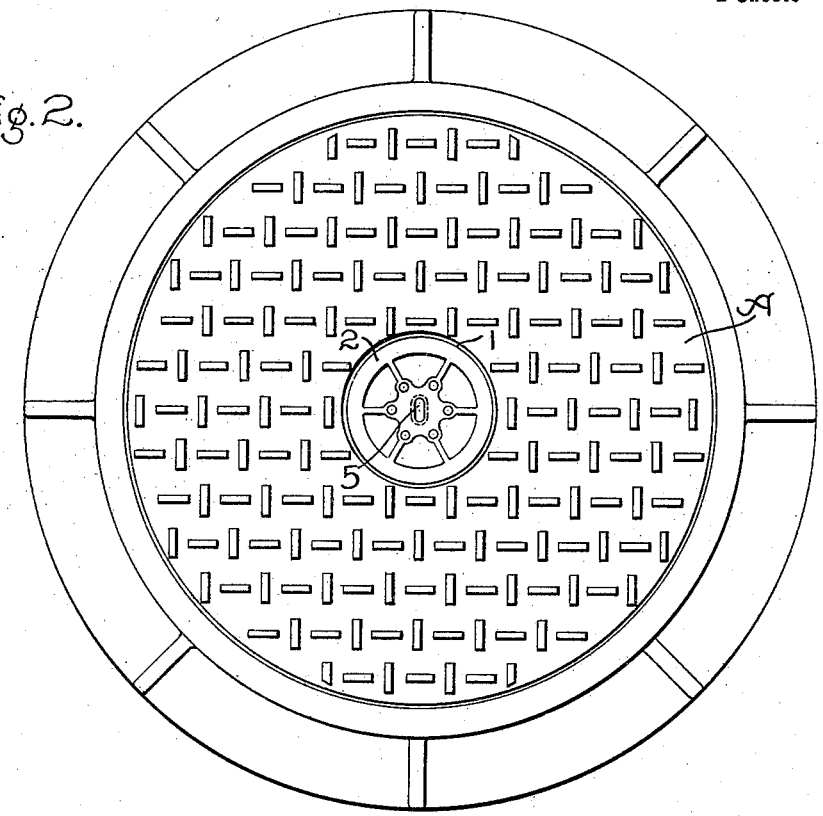
Figure 3:
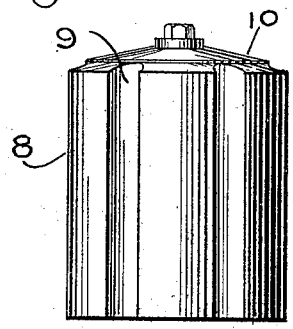
Figure 5:
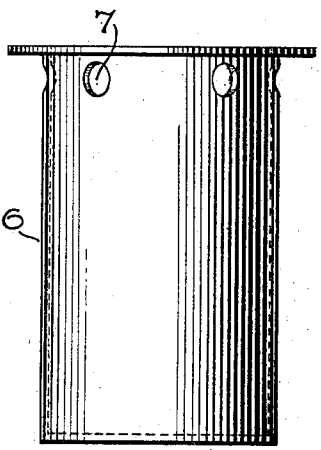
Figure 4:
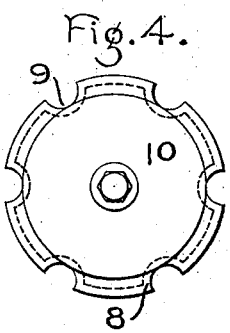

In the drawings, which illustrate one specific form of my invention, Figure 1 is a section of a vault or conduit provided with a cover constructed in accordance with my invention. Fig. 2 is a plan of the manhole-cover provided with the hand-hole cover. Fig. 3 is an elevation of the float. Fig. 4 is a plan of the same, and Fig. 5 is an elevation of the trap.

A is the main cover, which may be roughened on the top surface and has a hand-hole (shown at 1) at any desired part. A cover 2 for this hole is supported in the main cover A, as shown at 3, in such manner that water cannot flow around it into the conduit. The cover 2 has perforations 4, which may be tapered and smaller at the top in order that they may not become permanently clogged by dirt or refuse. 5 is an oblong opening to permit the insertion of a hook to lift out the cover.

Supported below the cover 2 is a trap 6, which may be made in any desired shape and preferably of material not subject to oxidation, such as copper. This trap 6 may be supported on and carried by the cover 2 or independent thereof and supported by or upon the main cover A, as shown in Fig. 1. Around the upper part of the sides of the trap are perforations 7. A float 8 is placed inside the trap 6, the float being of any suitable material, but preferably of a non-oxidizable metal, such as copper. Means must be provided to permit the water to flow beneath the float, and one method is here illustrated, as the lateral grooves 9 in the float.

The means for making a water-tight joint between the cover 2 and the float 8 are here shown as a rubber disk 10, secured to the float, and a depending annular flange 11 of the cover 2. As shown, the surfaces of the disk are inclined from the center, and the lower edge of the flange is beveled.

In operation the device normally permits a free ventilation of the vault or conduit, the air passing through the holes 4, trap 6, and perforations 7; but no air can pass when the water rises to the height of the edge of the flange 11. Any dirt which may enter through the small tops of the holes 4 is caught in the trap and may subsequently be removed on first removing the cover 2, when the water in the trap may be drawn off to again permit the circulation of air. When the streets are flooded with water from any cause, it will pass through the holes 4 and the grooves 9, causing the float to rise and stop the influx before the water reaches the perforations 7. After the water has been removed the apparatus will again serve as a ventilator and be ready to guard against the next flooding of the street.

What I claim as new, and desire to secure by Letters Patent of the United States, is—

1. The combination, with a vault-cover, of a water-trap beneath said cover, communications between the vault and outer air through the trap and cover, and means for checking the influx of water into the trap.

2. The combination, with a vault-cover, of a water-trap beneath said cover, communications between the vault and outer air through the trap and cover, means for checking the influx of water into the trap before the water flows into the vault, and means for permitting the contents of the trap to be removed, substantially as described.

3. The combination, with a vault-cover, of a water-trap beneath said cover, communications between the vault and outer air through the trap and cover, a float in said trap adapted to check the influx of water before the water flows into the vault, and means for permitting the contents of the trap to be removed, substantially as described.

4. A vault-cover having a hand-hole, a cover for said hole, ventilating means, a trap beneath said cover having holes communicating with the vault, and a float in said trap adapted to check the influx of water before the water-level reaches the holes in the trap, substantially as described.

5. A vault-cover having a hand-hole, a cover for said hole, provided with perforations, a trap beneath said cover, having holes communicating with the vault, a float in said trap, and grooves in said float to permit water to pass beneath the float, substantially as described.

6. A vault-cover having a hand-hole, a cover for said hole, provided with perforations, a trap beneath said cover, having holes communicating with the vault, an annular flange depending from said hand-hole cover into the trap, and extending below the opening in said trap, and a float in said trap adapted to engage with said flange to check the influx of water, substantially as described.

7. A vault-cover having a hand-hole, a cover for said hand-hole provided with perforations, a trap beneath said cover, having holes communicating with the vault, an annular flange depending from said hand-hole cover into the trap, extending below the openings in said trap, and having lower beveled edges, and a float in said trap, provided with an upper rubber disk having inclined surfaces, and adapted to engage with the beveled edges of said flange to check the influx of water, substantially as described.

In witness whereof I have hereunto set my hand this 3d day of August, 1899.

BEN WILLARD.

Witnesses:
HANSON W. KELLY.
W. H. KECK.